April 29, 1958     W. A. SEARGEANT     2,832,426
TELEDYNAMIC SYSTEM FOR THE CONTROL
OF SELF-PROPELLED VEHICLES Filed Dec. 20, 1951     5 Sheets-Sheet 1

William A. Seargeant
INVENTOR.

BY *[signatures]*
Attorneys

April 29, 1958
W. A. SEARGEANT
2,832,426
TELEDYNAMIC SYSTEM FOR THE CONTROL
OF SELF-PROPELLED VEHICLES
Filed Dec. 20, 1951
5 Sheets-Sheet 2
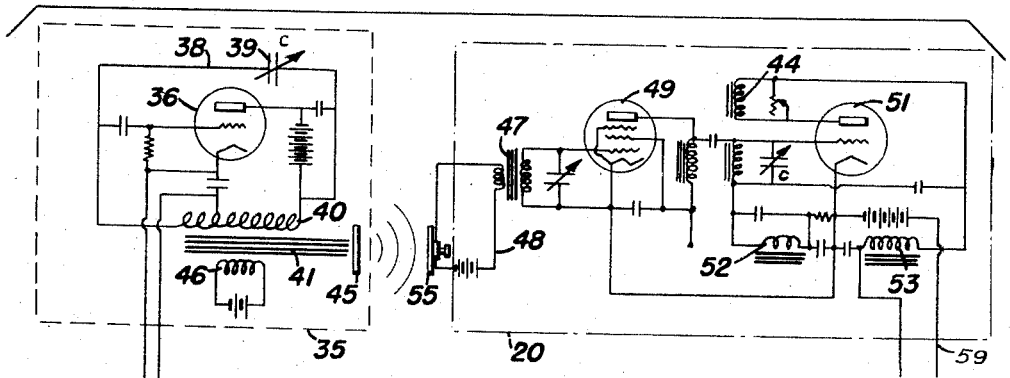
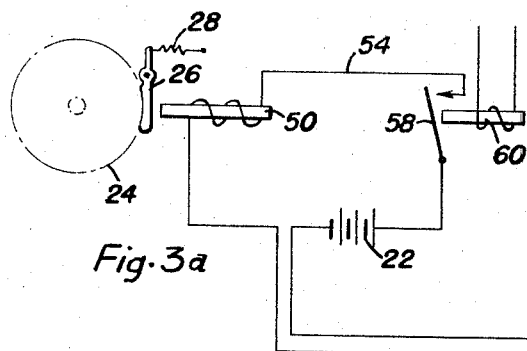
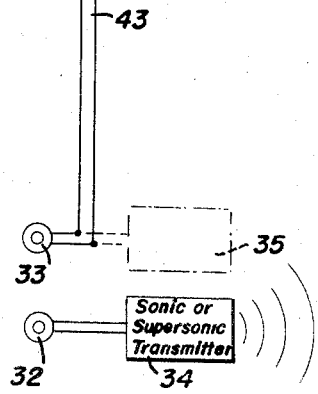
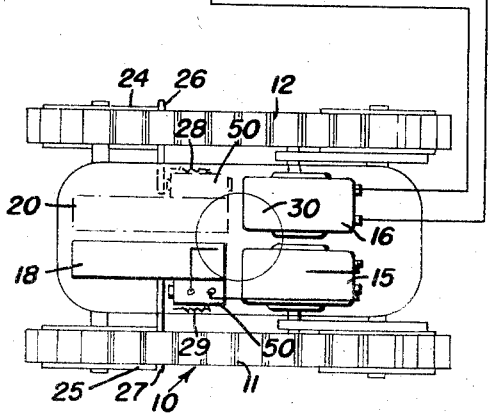
Fig.3
Fig.3a
William A. Seargeant
INVENTOR.
BY
Attorneys April 29, 1958     W. A. SEARGEANT     2,832,426
TELEDYNAMIC SYSTEM FOR THE CONTROL
OF SELF-PROPELLED VEHICLES
Filed Dec. 20, 1951     5 Sheets-Sheet 3
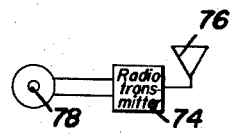
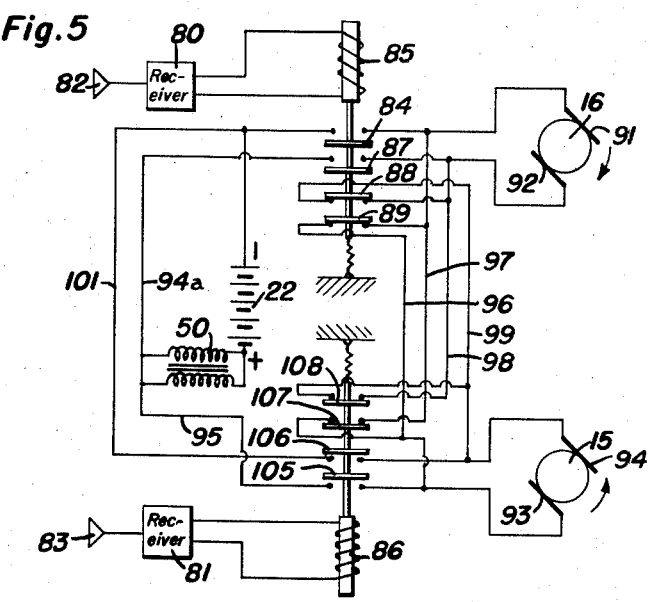
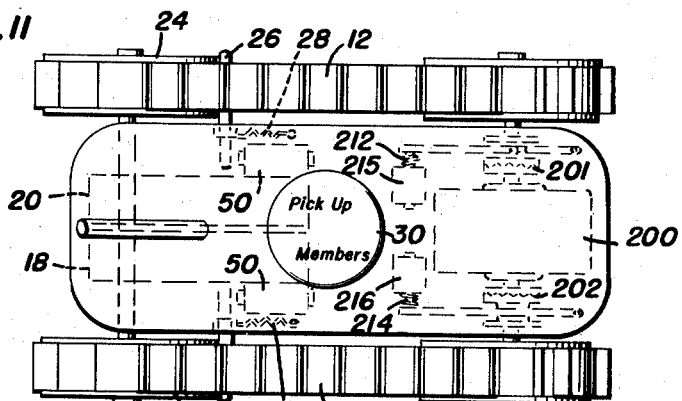
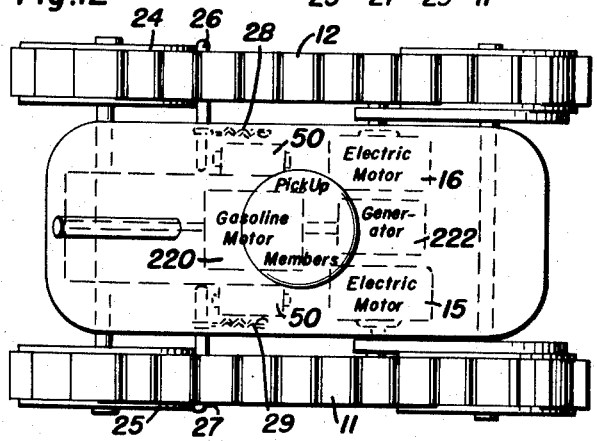
William A. Seargeant
INVENTOR.

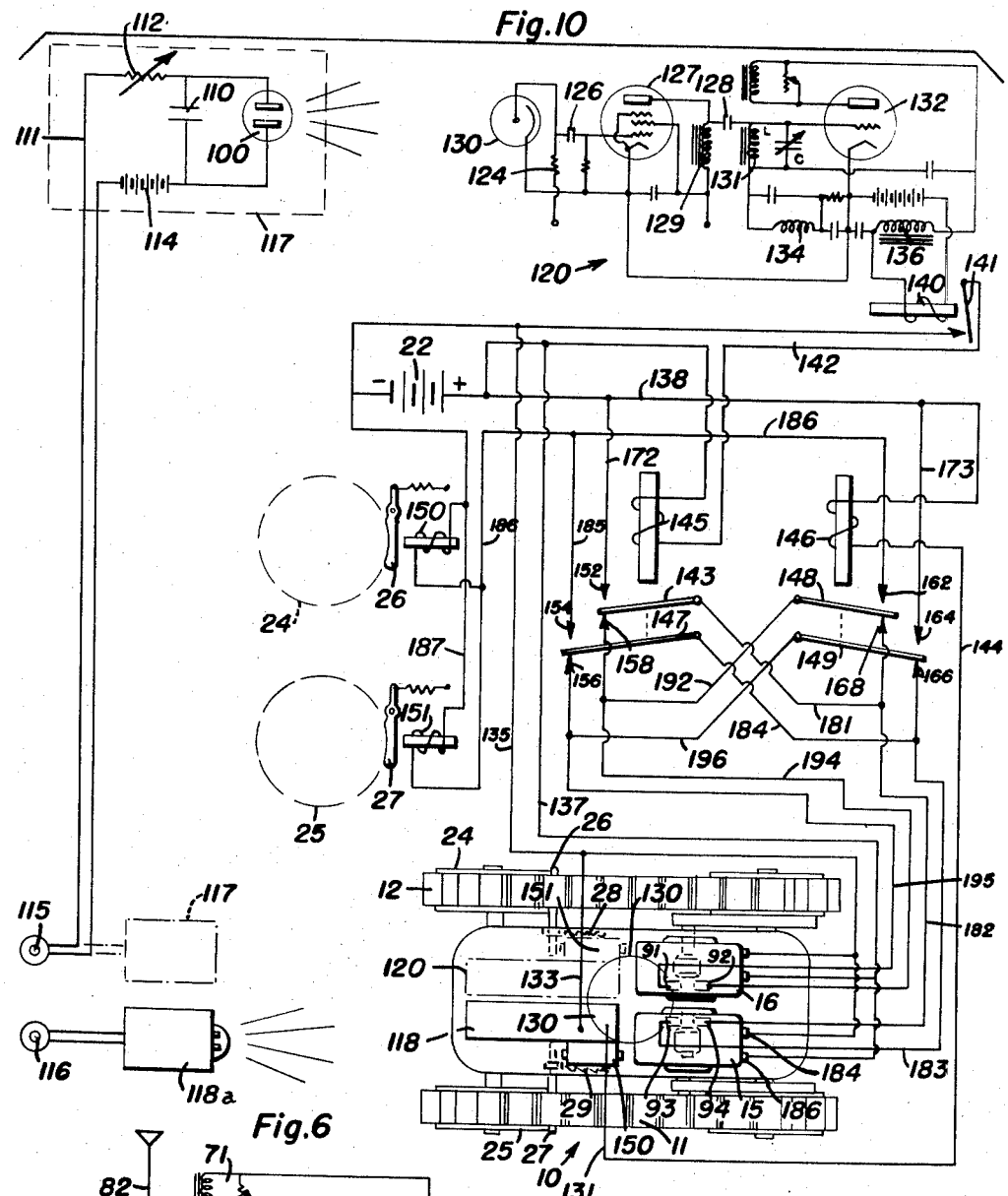
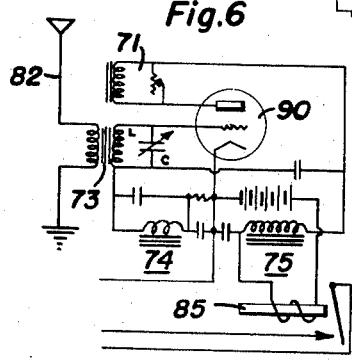

April 29, 1958

W. A. SEARGEANT 2,832,426

TELEDYNAMIC SYSTEM FOR THE CONTROL
OF SELF-PROPELLED VEHICLES

Filed Dec. 20, 1951

William A. Seargeant
INVENTOR.

United States Patent Office 2,832,426
Patented Apr. 29, 1958

2,832,426

TELEDYNAMIC SYSTEM FOR THE CONTROL OF SELF-PROPELLED VEHICLES

William A. Seargeant, Cashion, Ariz.

Application December 20, 1951, Serial No. 262,637

1 Claim. (Cl. 180—2)

This invention relates to the teledynamic control of self-propelled vehicles or vessels having a plurality of propelling means and it has for its primary object to provide a simple and effective remote control system, operating by means of wave propagated signals, and guiding the movement of a vehicle or vessel which is without connection with a fixed point, in all desired directions by a control, through independent channels or through a combination of independent channels, either of a single propelling action or of a fixed combination of propelling actions, the signal transmission through one channel or through a combination of channels starting or stopping said directive propelling actions which are so combined that the vehicle moves in the desired direction.

The remote control of moving vehicles or vessels is usually produced by operating a number of direct propulsion and direction controls, acting on the propelling engine or engines and on the steering mechanism or mechanisms of the vehicle or vessel. This control system has either to operate with as many transmission channels as there are control operations or it has to use a plurality of different signals in each or in some of the channels.

Manifestly such a system is complex and requires trained operators. It is not suitable for systems requiring a simplified control operable by any unskilled person by a limited number of simple manipulations.

In connection with vehicles or vessels having electric propulsion means, the feeding circuit of which is under control of the operator, another system has been proposed which consists in providing a plurality of propulsion means, for instance two, which are separately controlled by switches of the reversing switch type and which therefore permit to reverse the direction of operation of the electric motors and of the propulsion means driven by them. This system is simple to control but is very difficult to adapt for those remote control arrangements which are not supplied with current from a fixed point and in which the feeding current for the propelling means is therefore not under the direct control of the operator.

The invention has for one of its objects to provide a system of this type in which control is solely performed through wave propagation and in which independent control of a plurality of propelling means produces various combinations of propelling movements and thereby a complete directional control.

It is thus an object of the invention to provide control means for a vehicle with a plurality of propulsion means which is without mechanical or electrical connection with a stationary point, said control means being operated by waves propagated or radiated through space and when so operated directly or indirectly governs the starting and stopping of the propulsion devices and their direction of action, the combination of the actions of the propulsion devices thus determining the direction of movement of the vehicle or vessel.

A further object of the invention consists in providing a system of selectively operable electro-magnetic controls energized by means of wave propagated signals, the controlling influence of each of said electro-magnetic controls extending to the energization of all the driving means for the propulsion members which are normally set for propulsion in different directions. Each of said selectively operable electro-magnetic and control means has complete control of one of the driving means under all conditions as long as the wave propagated signal by which it is selectively operated is transmitted. The control of the other driving means may on the other hand be taken over by another selectively operable electro-magnetic control means upon transmission of specific signals for which it is selective. The said electro-magnetic control means is capable of operating the driving means controlled by said control device in a sense which is opposed to that in which it was operated when energized in common with other driving means by the first named signal operated control means.

A further object of the invention consists in providing a system of electro-magnetic control means for simultaneously controlling the energization of the driving or coupling means or a plurality of propulsion devices. The control means are so arranged that the use of one channel of signal transmission energizes the said propulsion devices in different directions. The use of a plurality of channels for the signal transmission will on the other hand energize the propulsion devices in the same direction.

A further object of the invention consists in providing a simplified system of the above characterized type in which automatically applied brakes for the propulsion means are used and which are released by those signals which control the energization of the driving means for the said propulsion devices.

A further object of the invention consists in providing a control system of the above described simplified type which is operable by any kind of undulatory energy transmitted through space.

A further object of the invention consists in a specific system usable for light waves which is frequency responsive within a low frequency range.

A further object of the invention consists in providing a system of magnetically controlling the connection or coupling of the propulsion devices with a permanently running driving engine.

Further objects of a more specific nature will be apparent from the following detailed specification.

The invention is illustrated in the accompanying drawing showing several embodiments of the same by way of example. It is however to be understood that the examples which are selected are of an illustrative nature and they intend to provide an illustration of the principle of the invention and the best mode of applying said principle. The embodiments and their modifications which are shown in the drawing however do not provide a complete survey of the possible modifications of the invention and a departure from the examples shown is therefore not necessarily a departure from the essence of the invention.

In the drawings:

Figure 3 is a diagram of the connections illustrating a transmitter and receiver according to one mode of a teledynamic control of the model, the signal transmission being performed by acoustic or supersonic waves.

Figure 3a is a diagram of the connections of the directional driving mechanism actuated and controlled by the receiver of transmitted signals.

Figure 5 is a diagram of the connections illustrating another control system of the vehicle with the control signals again transmitted by radio waves.

Figure 6 is a diagram of a receiver operable by radio waves and suitable for any of the radio wave operated systems above illustrated.

Figure 10 is a diagram of the connections for another modification of the control system and for a control system which is operated by light impulses.

Figure 11 is a plan view of a model provided with a motor which is running continuously, the driving power of the motor being applied by means of electro-magnetically controlled couplings which are energized by the received signals and thus control the propulsion means.

Figure 12 is another plan view of a model driven by a gasoline motor which is continuously running and which is driving a generator providing electric currents to electric motors the transmission of currents from the generator to the motor being controlled by the control system according to the invention.

Figure 1:
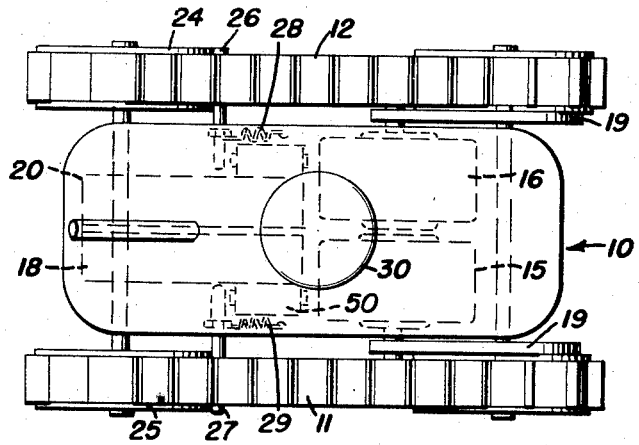
Figure 1 is a plan view of a model in the form of a toy representing an armoured vehicle.

The remote control system according to the invention, is based on the independent control of a plurality of separately energizable directional driving mechanisms mounted on the same mobile object, vehicle or vehicles and while it is to be understood that the driving mechanisms may be connected with any desired propulsion mechanism, the invention will be hereinafter described in connection with a model, display object or toy which is moving on a surface by means of two independently driven sets of wheels or treads or tracks, said model, display object or toy being controlled without any physical connection between its driving means and the control point or its driving means and a source of electrical currents.

Two different methods of directional driving producing the desired all-round mobility on the surface on which the object, vehicle or toy moves are hereinafter described, one method being of a type which is best termed "a differential motion" directional driving method, the other method being of a type best termed "braking" method. The differential motion method is best usable in connection with vehicles, models or toys having two independent propelling means on the two sides and the control is exercised by changing the direction of motion of the driving means for the propulsion devices either independently or simultaneously.

The second or braking method is likewise applicable to vehicles, models or toys with two independent propulsion means. The method operates by braking or locking the mechanism normally and by controlling the supply of power to the driving motor for the propulsion means on one side and the release of the brake simultaneously, the control for these mechanisms on both sides being exercised independently of the other.

Obviously with both methods, in the case of a vehicle model or toy provided with independently driven wheels, endless treads and the like, the difference in the propulsion movement imparted by the propulsion devices on the two sides of the vehicle which is produceable by the independent control of the propulsion means on the two sides permits the vehicle, model or toy to turn in any direction.

To produce a remote control system without physical connection between the controlled object and the controlling device a known wave propagated signal transmission method may be used, the most obvious method being a control by electro-magnetic waves. However, also light control or control by sonic or supersonic waves may be used, examples for both signal transmission methods being hereinafter given. It is to be understood in connection with these examples that the method of transmitting a signal at a distance by the propagation of waves through space described in connection with one modification of the invention is usable also for all other modifications and is not tied to the particular control method which has been illustrated in connection therewith. The above described methods of control permit the control of the object, model or toy with great speed and ease of maneuvering. Practically, speed and ease of control is merely obtainable if the control is reduced to the operation of two extremely simple manually operated control means for instance, by using two manually controlled switches, such as push buttons or the like. Any increase in the number of manually operated switches or handles and any increase in the number of operations to be performed with the manual control detracts instantly and markedly from the speed of control and the ease of maneuvering and is therefore to be considered as a major disadvantage.

Figure 2:
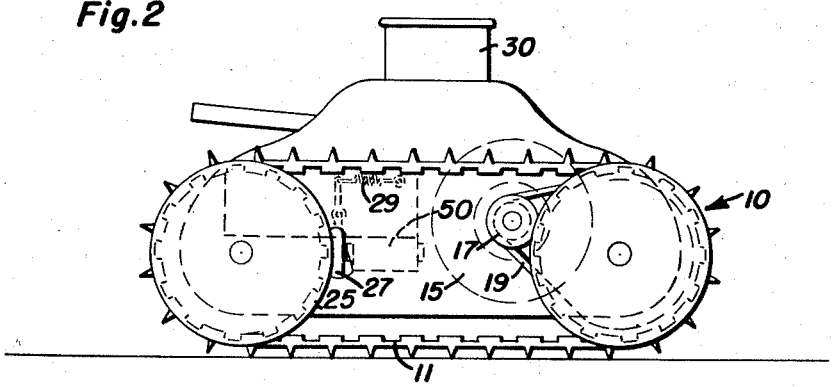
Figure 2 is a side view of the model illustrated in Figure 1.

Figures 1 and 2 illustrate a model or toy in the shape of an armoured vehicle or tank 10. The tank is driven by endless treads 11 and 12, each tread being driven by an electric motor 15, 16 respectively by means of a pulley 17 and a rubber belt 19. The two electric motors are separately and independently controlled. The vehicle is provided with two receivers 18, 20 for receiving the control signals which are transmitted from a remote point and each receiver is adapted to control either one of the two electric motors 15, 16 or both electric motors as will be hereinafter described.

Each endless tread of the vehicle is provided with a brake drum 24, 25 against which a brake shoe, band or other braking member 26, 27 is applied. The braking members 26, 27 may be pressed permanently against the brake drum by means of a spring 28, 29 respectively, so that the vehicle is normally braked and the release of the brake is only obtained by the energization of a release magnet 50 which is energized simultaneously with the energization of the electric motor driving the tread.

The vehicle or toy need not be driven by electric motors and examples of other drives are described below.

If however an electric motor is used the vehicle must be provided with a battery 22 which may be a dry cell battery or a secondary battery depending on the size of the vehicle and on other factors.

On top of the vehicle the signal pick-up member 30 is located which is preferably a twin arrangement, an individual pick-up member being provided for each of the two receivers 18 and 20. This pick-up member consists of an antenna, or a microphone, or a photo-electric cell or the like each of which controls the energization of the drive motor whenever a signal is picked up.

An embodiment of the invention using the above described equipment of the vehicle 10 and also using the method which has been called the "braking" method is illustrated in Figure 3a. This equipment may be actuated by any receiver such as the receiver illustrated in Figure 3 in which the control signals are transmitted by means of sonic or supersonic waves or by the radio wave receiver which is diagrammatically illustrated in Figure 4 or in Figure 6.

The sonic or supersonic transmitter illustrated in Figure 3, which is under the control of the operator comprises two transmitter units 34, 35, each controlled by a push button switch 32, 33. Each transmitter unit produces and broadcasts waves of a definite frequency which acts on one of the receivers 18, 20 only. For instance, the transmitter unit 34 produces sonic or supersonic waves acting on receiver 18 only, while the transmitter unit 35 produces waves of a different frequency which acts on receiver 20 only.

In order to explain the transmision of signals in detail the equipment of the transmitter station 35 and of the signal receiver station 20 have been illustrated in detail in a diagram, which, for the sake of clarity, shows the units used and their connections separately; but it is to be understood that the equipment illustrated in the diagram is supposed to be located in the manner indicated in dots and dashes in the transmitter station and in said receiver on the vehicle. This receiver 20 acts on the driving and braking members 24, 26 and 28 indicated by the same reference letters which are shown as being located on the vehicle in Figures 1, 2 and 3a.

A sonic transmitter is of course mainly useful at relatively short distances where the rapid attenuation of the sound and the appreciable time lag due to the slow speed of propagation of the sound is not noticeable.

The transmitter unit may produce, for instance, a frequency of around 15,000 cycles per second or it may produce a supersonic frequency, if so desired, by means of an electronic tube 36 arranged in a conventional circuit with an adjustable back feed circuit 38 including a condenser 39 which produces the oscillation of the tube at the desired frequency. Included in the circuit is a coil 40 surrounding a finely laminated magnet core 41 which may be of the straight type or of the horseshoe type and which drives a diaphragm 45 located in front of its pole which is so held and constructed that its free oscillation is equal to the frequency of the sound to be transmitted.

In order to avoid the reversing of the polarity of the magnet 41, the latter may be provided with a permanently energized polarizing circuit 46 which produces a constant magnetic flux on which the variable magnetic flux due to the oscillations in the tube is superposed.

The transmitter unit 35 is controlled by a push button switch 33 which, by means of conductors 43, controls the operation of the tube 36 and its operating circuit.

It will be understood that when the tube 36 oscillates with a frequency which is equal to and in resonance with the free oscillation frequency of the diaphragm 45 the latter will produce sonic waves which are propagated through space and which in due course will reach the microphone 55 which is arranged on the pick-up device 30 of the vehicle. The microphone unit 55 is also provided with a diaphragm having a free or natural oscillation equal to that produced by the diaphragm 45 of the transmitter 35. If a microphone is used as a pick-up device it must be of the type operating in all positions. This microphone controls the local circuit 48 including an audio transformer 47 with a finely laminated core transmitting the oscillations which are set up by the microphone to the input circuit of an audio amplifier shown as a pentode 49 which forms the first stage of the amplifier, the second stage being formed by a triode 51 arranged in a superregenerative circuit 44. Quench coils 52 and 53 may be used in the superregenerative circuit to suppress a high frequency signal when an audio or low frequency is received.

It will be clear that when the signal is received and acts on the amplifying pentode 49 and triode 51, the plate current of the tube 51 rises and therefore a current of increased strength flows through the conductors 59 which leads to the control magnet of the directional drive mechanism. This control magnet is, for instance, indicated at 69 in Figure 3a or at 140 in Figure 10. If it is assumed that the mechanism shown in Figure 3a is controlled upon energization of the receiver which in turn energizes the control relay 60, the relay armature 58 is operated, the circuit 54 is closed and the brake magnet 50 as well as the electric motor 16 of the vehicle is energized by the battery 22. Therefore the brake 26 which has been applied constantly against the brake drum 24 by means of spring 28 is lifted and the electric motor is powered and starts to rotate.

If merely a single button, for instance 33, has been pressed only one tread (12 in Figure 3) will start to move. The other tread 11 is still held by the brake 27 applied against the brake drum 25 which has not been released and the vehicle 10 will therefore spin around the fixed tread which is still braked.

It will be understood that when the second push button switch 32 is operated the transmitter unit 34, which is identical with the transmitter unit shown at 35, will produce sound waves of a frequency which differs from the frequency of the sound waves produced by the transmitter unit 35 to such an extent that only receiver 18 will be operated while receiver 20 remains unaffected. Receiver 18 controls the driving and braking mechanism associated with tread 11. The operation of the push button switch 32 therefore results in the operation of the tread 11.

If both push button switches 32 and 33 are therefore operated the vehicle moves forward in a straight line as now both electric motors are energized in the same sense and both brakes are released. A change of direction of motion of the vehicle to any desired extent may therefore be produced by releasing one of the buttons for a short while. If both push buttons are released the vehicle stops instantly as the brake shoes are again applied as soon as the electric motors are de-energized.

Figure 4:
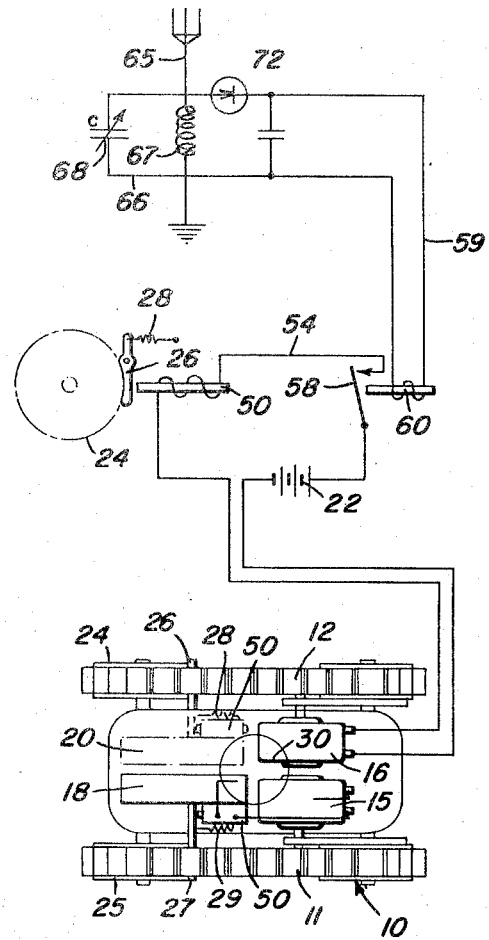
Figure 4 is a diagram illustrating the operation of the receiver when the signals are transmitted by radio waves.

The specific maner illustrated in Figure 3 of producing the energization of the drive and brake control relay 60 is not material and other manners of producing such an energization, such as those shown in Figures 4, 5 and 6 may be used as well.

Figure 4 illustrates an embodiment of the invention which in all respects is supposed to be identical with the one shown in Figure 3 but in which the signal acting on the receivers is transmitted by means of an electro-magnetic wave which produces a sufficient voltage for relay operation after detection. This circuit is therefore shown without an amplifier, but it is to be understood that an amplifier may be inserted to produce a voltage which will operate the relay if necessary.

The transmitter in this case emits radio waves of a certain frequency when the push button switch is pressed. These waves reach the antenna 65 of the receiver, which antenna is the pick-up member of the vehicle. The antenna is connected with the tuned antenna circuit 66 which includes the coil 67 and the adjustable condenser 68. The oscillations which are developed in the antenna circuit are rectified (with or without preceding amplification) in the rectifier 72 which may be of any suitable type and which may even be an ordinary crystal detector or a selenium detector. The rectified currents, being of sufficient magnitude, energize the drive and brake control relay 60, which is identical with the relay denoted by the same reference numeral in Figure 3a. The drive and brake control relay 60 operates the armature 58. The remainder of the operation has already been described in connection with Figure 3a.

In Figure 5 of the drawing an embodiment of the invention is shown which operates according to the differential motion method which has been described. This modification is also controlled by electro-magnetic waves and comprises two radio transmitters 74 and 75 each provided with an antenna 76, 77 and push button switches 78, 79 for controlling or keying the radio transmission. The waves which are radiated may be of the CW type and the push button or key 78, 79, when pressed, either closes the circuit and produces radiation of a train of CW or opens the circuit and stops the transmission according to the prevailing conditions. The latter case will be briefly mentioned below as it is useful for certain specific situations, but in most cases the operation of the push button switch closes the keying circuit of the transmitter with the result that continuous wave trains of a definite frequency are radiated and may be picked up by the receiver 80 if the push button switch 78 is closed, or may be picked up by the receiver 81 if push button switch 79 should be closed. The antenna circuits of the receivers, which may be identical with those shown in Figure 4 are tuned to the frequencies radiated by the respective transmitters and the frequencies must of course be sufficiently differentiated to exclude a cross operation.

Each receiver moreover comprises an antenna 82, 83 arranged on top of the vehicle within the area marked 30 in Figures 1 and 2 and the antenna circuits may be connected with suitable amplifiers and/or detectors to produce the local current operating a relay 85 or 86 respectively, which relays correspond to relay 60 in Figures 3a and 4. The arrangement of the receivers 80 and 81 may either be that shown in Figure 4, already described, or if the transmitters are not sufficiently powerful or if the distance between the control station and the controlled vehicle is too large, the arrangement may be that shown in Figure 6. This receiver is provided with a superregenerative amplifier and detector circuit which is well known in itself coupled with the antenna 82 or 83 by means of coil 73. Said circuit may be provided with the two quench coils 74 and 75 for suppressing unwanted frequencies, while the plate of the tube 90 is connected with the winding of the relay 85 which is operated when a signal is received by the antenna 82.

The two relays 85, 86 control the driving circuits for the electric motors of the vehicle. Each of the electric driving motors 15, 16 in this receiving arrangement is not merely controlled by one relay, but each motor 15 and 16 is also controlled by the relays of both receivers. As seen, each relay 85, 86 is provided with an armature having four switch arms 84, 87, 88, 89 and 105, 106, 107 and 108 respectively. Relay 85, for instance, by means of its switch arms 84 and 87 controls the electric motor 16, the armature of which with the two brushes 91 and 92 is shown in the figure. It is assumed that the field winding (whether a shunt or a series winding) will be so connected with the circuit shown that passage of the current in one direction in the armature, say from brush 92 to brush 91, produces the rotation in one direction and the passage of the current through the armature in the opposite direction say from brush 91 to brush 92 produces a rotation in the opposite direction. When electric motor 16 is energized, the motor 15 is energized with it by means of the cross connections 96, 97, 98 and 99 which are controlled by the rest contacts of the switch arms 88, 89 and 107, 108 of the two relays 85, 86 respectfully. By virtue of this control the cross connection between the two electric motors is only operative if at least one of the two relays is at rest, while this cross connection is completely cut off if both relays are energized.

If it is now assumed that the push button switch 78 is closed so that the transmitter 74 operates, the receiver 82 which is tuned to the same wave length will also be operated in the manner above described and will operate relay 85. This relay connects the negative side of the battery 22 with brush 91 through the switch arm 84 of relay 85, while the positive side of the battery 22 is connected over the braking solenoid 50 on the same side on which the motor is arranged over conductor 94a and by means of switch arm 87 with the brush 92. At the same time, however, the brush 93 of the electric motor 15 is connected with the negative side of the battery over the cross connection 97 and switch arm 107 of relay 86 which is in its position of rest and the brush 94 of the electric motor 15 is connected with the positive side of the battery 22 over the cross connection 98 and the switch arm 108 of relay 86. The polarity of the two sets of brushes 91—92 and 93—94 is diagrammatically indicated in Figure 7. With these connections the electric motor 16 may, for instance, be said to be rotating in one direction, say clockwise when viewed from one side of the vehicle, while motor 15 rotates in the opposite sense, say counter-clockwise, when viewed from the same side of the vehicle. The two electric motors therefore attempt to drive the vehicle in two different directions and the result is that the vehicle turns around a vertical axis passing through its center in one direction, say clockwise.

The two solenoids 50 in the diagram represent the brake solenoids on both sides of the vehicle which are energized when the electric motors 16, 15 are energized, thereby lifting the brake shoe and releasing the propulsion means.

If button 79 should, for instance, be operated, the relay 86 would be operated in the manner already described in connection with relay 85. The energization of the relay connects the positive side of the battery over the brake solenoids 50 and conductor 95 by means of the switch arm 105 with the brush 93 while the negative side of the battery is simultaneously connected to brush 94 over conductor 101 and switch arm 106 of the relay 86. By virtue of the cross connections simultaneously the positive side of the battery is connected with brush 91 while the negative side of the battery is connected with brush 92 of motor 16 over conductor 99. The connection with the brushes of electric motor 16 has been made over the switch arms 88 and 89 by means of the conductors 96 and 99 which are controlled by the relay 85.

Figure 8:
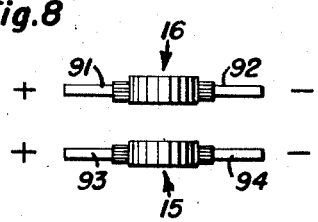
Figures 7, 8 and 9 are diagrammatic representations of the polarity of the brushes of the armature of the electric motor upon reception of signals through various signal channels and through a combination of said channels.
Figure 7:
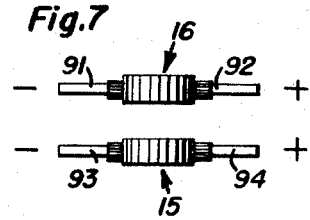

The polarity of the brushes is illustrated in the diagram in Figure 8, and it will be seen that it is the opposite of that illustrated in Figure 7. Therefore the direction of the operating current is now reversed. If it is assumed that motor 16 when connected according to Figure 7 turns clockwise when viewed from one side of the vehicle, it must now be assumed that motor 16 when the polarity shown in Figure 8 has been established turns counter-clockwise. Likewise the direction of rotation of motor 15 is reversed and this motor now turns clockwise with the polarity shown in Figure 8.

Therefore the vehicle is now spinning around an axis passing approximately through the center in a direction which is opposite to the direction which was produced by the rotation of the motors indicated in Figure 7. This direction now would be counter-clockwise.

When both buttons 78 and 79 are pressed both transmitters 76 and 77 are operated simultaneously. Thereby also the receivers 82 and 83 are operated simultaneously and the relays 85 and 86 are both energized. As both relays are energized simultaneously the cross connections between the two electric motors 15 and 16 are interrupted. The motor 16 is connected as before described, the negative side of the battery being now connected with the brush 91, while the positive side of the battery is connected with brush 92. Likewise the energization of relay 86 connects brush 94 with the negative side of the battery and brush 93 with the positive side of the battery over the solenoids 50. All four cross connections 96, 97, 98, 99 are however interrupted at one of the two relays.

Figure 9:
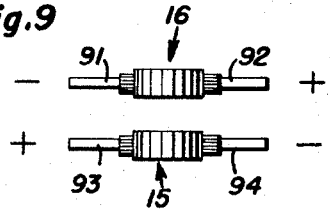

The connection of the brushes and the polarity which is thus produced is illustrated in Figure 9. It is seen that the motor 16 now rotates in the same direction in which it turned when button 78 was pressed and which is illustrated in the top diagram of Figure 7, while motor 15 turns in the direction in which it moves when the button 79 was pressed and which is illustrated in the bottom diagram in Figure 8. The result is therefore that the two electric motors 15 and 16 move in the same direction and therefore the vehicle will now move forward in a straight line.

The two push button switches 78, 79 therefore permit complete maneuverability as the vehicle can turn to the left or to the right and also can move forward in a straight line merely by operating either both push button switches or one of them.

The modification of the invention which is illustrated in Figure 10 uses a similar operational method with a somewhat simplified relay arrangement in which the control of the relay is exercised by means of light signals.

A control of the relays by means of differently colored light signals or by means of invisible rays is, of course, theoretically possible, if photo electric cells sensitive to rays produced by different frequencies are used. However, cells of this type have many disadvantages as the currents which are produced in cells of this type must undergo high amplification and moreover their structure is such that they are ill equipped for this type of rugged work. The ordinary photo-cell which is widely used is better equipped as it can stand very rough handling and produces a current which can be amplified in one or two amplification stages to such an extent that a relay can be operated. Nevertheless, as photo-cells produce a direct current the problem of obtaining a sufficient and reliable amplification is more difficult to solve than it is in the case when an alternating current is used.

If ordinary light sensitive cells are used the discrimination between signals operating different relays and especially the problem of transmitting signals to a number of simultaneously operating vehicles becomes a very difficult one.

According to the invention a transmitter is used producing light impulses of a characteristic type. These impulses are transformed in a photo-electric cell into current impulses which have a certain frequency and, if these light impulses are transmitted at different frequencies in different channels, the difference may be used to discriminate between the signals coming through said channels. This system has the further advantage that what is amplified according to the system is a series of impulses so that no longer a direct current is produced and therefore the problem of amplification of the current is simplified.

Light impulses at a predetermined rate may of course be produced by the well known means of a rotating disk with spaced holes moving in front of a light source. Since this method involves moving parts and a suitable arrangement without moving parts would be preferable. Such an arrangement consists for example in a flashing device for glow lamps which produces a flashing at a predetermined rate by means of a condenser and a resistance which are inserted into the operating circuit of the glow discharge lamp. This arrangement while well known by itself, is also shown in Figure 10 in which 100 indicates the glow lamp while 110 indicates a condenser connected across the glow lamp, a variable resistance 112 being inserted into the feeding circuit 111 of the glow discharge lamp. Said feeding circuit also contains a source of current such as a battery 114 and the push button switch 115. When the push button switch is operated the circuit is closed and the condenser is charged. The glow discharge tube, which may be a neon filled tube of conventional type, is at this time non-conducting. The battery voltage must in itself be lower than the operating voltage of the neon glow lamp. When the condenser charge has been built up sufficiently to reach the ignition potential of the neon glow lamp the condenser discharges through the said lamp which lights up. This discharge is maintained for some time as the discharge tube has an operating voltage which is much lower than the starting or ignition voltage of the tube, on account of the ionization within the tube which now sets in. The discharge through the neon tube will thus continue until the condenser has been discharged and has reached a voltage lower than the operating voltage of the glow discharge tube. Thereupon the discharge ceases and the condenser is again charged.

While the button is pressed the discharge lamp thus emits a series of flashes the frequency of which depends on the charging time of the condenser and the adjustment of the resistance. The frequency may therefore be exactly timed by a suitable adjustment of the resistance and of the condenser or of both.

Figure 10 shows two transmitters 117 and 118a each operated by a push button switch. The transmitter 118a is merely shown diagrammatically as a unit while transmitter 117 is shown in detail. The place which the transmitter 117 actually occupies as well as the place which is occupied by the receiver 120 is marked in dots and dashes.

The receivers 118 and 120 contain photo-electric cells located on the top of the vehicle at 130, the vehicle itself being in all essential parts other than the receiver identical with the vehicle already described in connection with Figure 3. The identical parts of the vehicle are designated by the same reference letters in which have been used in connection with the description for Figures 1, 2 and 3.

Each flashing of the neon discharge lamp produces a voltage fluctuation across resistance 124 connected with the anode of the photo-electric cell 130 and these pulses are of a definite frequency preferably of an audio frequency which has been previously adjusted by adjusting the condenser 110 and the resistance 112 of the transmitter. The current pulses are transmitted over condenser 126 to the pentode 127 and amplified. The amplified impulses are then transmitted to the tuned circuit 131 of the superregenerative tube 132 by means of coupling condenser 128. The audio choke coil 129 prevents the oscillations from reaching ground over the battery. The superregenerative amplifier and detector 132 may be of the type already described in connection with Figure 3. It is preferably provided with quench coils 134, 136. The coil 140 is a sensitive relay in series with the last named coil in the anode circuit of the tube 132.

The superregenerative circuit is selective for a frequency band and therefore responds only to pulses of a definite frequency while other pulses will not produce a signal. In this way two different signals may be sent each signal influencing one of the receivers 118, 120 respectively.

The electronic equipment of receiver 118 is identical with that of receiver 120 but is not shown. It is supposed to be located within the casing indicated at 118.

The relay 140 of the receiver 120 is provided with an armature 141 controlling a circuit 142 which includes the relay switch 145 and the battery 22. A circuit 144 controlled by the relay in receiver 118 (not shown) corresponding to relay 140 includes a similar relay switch 146 which is also connected with the battery 22. Both relay switches 145 and 146 are double pole, double throw relay switches, each having two armatures or contractor arms 143, 147 and 148, 149 respectively. Each contactor arm cooperates with two fixed contacts comprising operative contacts 152, 154 and 162, 164 respectively and rest contacts 158, 156 and 168, 166 respectively.

Energization of relay 145 for instance by means of a signal obtained by pressing button 115 moves the contactor arms 143 and 147 into their operative position on contacts 152, 154.

Therefore, when push button switch 115 is, for instance, pressed the relay switch 145 is energized and a circuit is established which connects the positive side of the battery 22 over conductor 172, contact 152, contactor arm 143, conductor 181, rest contact 168 of contactor arm 148 of relay switch 146, and over conductors 192 and 194 to the right brush 92 of motor 16 in Figure 10. The left brush 91 of motor 16 in this figure is connected with the negative side of the battery by means of conductors 195, 196, contactor arm 149 and contact 166, conductor 184, contactor arm 147 now in operative position, contacts 154, conductors 185 and 186 and brake solenoids 150 and 151 and conductor 187.

Simultaneously, a circuit is closed which connects the positive side of the battery 22 over conductor 172 and contacts 152 and over contactor arm 143 and conductors 181 and 182 to the right brush 94 of motor 15 in Figure 10, the left brush 93 being connected over conductors 183, 184 with contactor arm 147 and over contacts 154 and conductors 185 and 186 and over the brake electro-magnets 150 and 151 and conductor 187 to the negative side of the battery.

The connection of the brushes of motors 15 and 16 corresponds therefore to the connection diagrammatically shown in Figure 7.

The connections which have above been explained energize the motor 16 in such a manner that it runs in one definite direction, say clockwise, while the other motor 15 runs in a different direction, say counter-clockwise, when both motors are viewed from the same side of the vehicle and therefore the vehicle turns around clockwise, the brake solenoids 150 and 151 both releasing the brake shoes 26, 27.

Let it now be assumed that button 116 is pressed. In this case the receiver 118 operates its relay which corresponds to relay 140 and thereby the circuit 144 is closed and relay 146 is energized while relay 145 remains in a position of rest. This results in connecting the positive side of the battery 22 over 138, 173, contacts 164, contactor arm 149, conductors 196, 195 with brush 91 of motor 16. The brush 92 is now connected with the negative side of the battery 22 over 194, 192, contactor arm 148, contact 162, conductors 186, brake solenoids 150, 151 and conductors 187.

Simultaneously, the brush 93 of motor 15 is connected over 183, 184, contactor 147, rest contact 156, conductor 196, contactor arm 149, contact 164, conductors 173 and 138 to the positive side of the battery 22 while brush 94 is connected to the negative side of the battery over conductors 182, 181, contactor arm 143, rest contact 158, conductor 192, contactor arm 148, contact 162, conductor 186, brake solenoids 150, 151 and conductor 187.

The polarity of the brushes of the armature of the motors 15 and 16 is therefore that shown in Figure 8. The two motors 16 and 15 again rotate in opposite directions but both motors also rotate in a direction which is opposite to that in which they were rotating when the polarity of the brushes was that shown in Figure 7. The vehicle therefore turns on its place around an axis in a direction opposite to that around which it turned when button 115 was pressed.

When both buttons 115 and 116 are pressed both relays 145 and 146 are energized at the same time as the relays 140 in both receivers are now operated. The positive side of the battery is therefore connected with brushes 91 and 94, the negative side with brushes 92 and 93. The connection with brush 91 runs over 173, 164, 149, 196, 195; the connection with brush 94 runs over 172, 152, 143, 181, 182. The connection of the negative side of the battery with brush 92 runs over 187, 150 and 151, 186, 162, 148, 192, 194. The connection with brush 93 runs over 187, 150 and 151, 186, 185, 154, 147, 184, 183.

Therefore the connection of the brushes in this case corresponds to that shown in Figure 9, the negative and positive sides being merely exchanged. Both electric motors 15 and 16 now run in the same direction and the vehicle therefore moves ahead in a straight line.

In all modifications which have been described the arrangement may be such that the pressing of the right button operating the button switch in a given assembly makes the vehicle turn to the right, while the pressing of the left button operating the button switch controlling the other transmitter makes the vehicle turn to the left, while the pressing of both buttons results in a forward movement.

The arrangement may also, of course, be the reverse, insofar as the push button switches may interrupt the transmission of signals, these signals being transmitted continuously as soon as an operating switch (not shown) has been closed. The interruption of one of the signal transmissions in this case produces the turning of the vehicle. The latter method may be preferable when the operator and transmitter are both installed on a vehicle for in this case the remotely controlled vehicle automatically follows its course if no control is operated and therefore follows the transmitting vehicle in its movement. The operator therefore has merely to operate the push button switches when the transmitting vehicle changes its direction. The operation in such a case is however exactly the same as that already described.

It has already been stated above that the model, display object or toy need not be driven by an electric motor.

Figure 11 shows an example in which another type of motor 200, whether an electric motor or an internal combustion engine or a spring motor or any other type of motor, is used, the controlling means being electromagnetic couplings or clutches 201, 202. While any type of electro-magnetic clutch or coupling may be usable, especially the type operating with magnetic disks or plates on the shaft which is directly acted upon by a magnet rotating with one of the shafts the drawing shows for the sake of clearness only an electro-magnet operating a friction clutch on both disks. Obviously the control as described, is essentially the same as that described in connection with Figure 3, the difference being solely that instead of motors designated by the symbols 15, 16 coupling electro-magnets are shown in Figure 11 and designated by 215 and 216. When de-energized a spring 212, 214 keeps the clutch or coupling open. When one of the magnets is energized the clutch couples the running motor 200 with the drive shaft of the tread. Simultaneously the brake solenoid 50 is energized, releasing the brake; the vehicle turns on the spot on that side on which the tread shaft is coupled with the motor. The modification, in all other respects, is alike to the modification shown in Figure 3 and the operation therefore explains itself.

For vehicles of the differential type driven by a motor other than an electric motor, for instance by a gas engine, the coupling control arrangement becomes more complex. It is therefore preferable to provide an electric drive. An electric generator 222 is driven by the non-electric motor 220, providing the electric motors 15 and 16 with current. The electric motors are then controlled in the manner which has been described in connection with Figure 5 or 10, the generator acting merely as a transportable source of current.

It will be understood that treads especially of the endless track type are only shown by way of example and that wheels may be driven in the same manner with merely obvious changes.

It will also be understood that constructive changes of an unessential nature may be made without in any way departing from the invention as claimed in the annexed claim.

Having described the invention, what is claimed as new is:

A teledynamic system for the control of self-propelling toy vehicles comprising two separate signal transmitting channels with space separated, physically unconnected transmitters and receivers in each channel, each transmitter producing signal currents of a definite frequency, each receiver being provided with means including a tuned circuit responsive to a corresponding one of the signal frequencies, means for translating the signal currents into a direct current, a drive-and-brake control relay in each receiver having an energizing circuit operated by the said direct current upon receipt of a signal, a propulsion means on each side of the vehicle, an electric motor on each side of the vehicle driving a respective one of the propulsion means, a brake operatively connected to and acting on each of said propulsion means, means for applying said brake to said propulsion means whenever the electric motor is deenergized, brake lifting means on each brake for the controlled lifting of the brake, thereby releasing the propulsion means, the said brake lifting means on both sides of the vehicles being controlled independently of each other, each of said brake lifting means including a solenoid, a source of current on said vehicle, an energizing circuit connected with said source of current and each electric motor, the energizing circuit for each electric motor being controlled by the drive-and-brake control relay of the respective one of the receivers, said drive-and-brake control relay, simultaneously with the energization of the energizing circuit of the electric motor, energizing the said solenoid thereby lifting the brake and releasing the propulsion means, thus producing a steering action in all directions by a cooperative differential action between the released and driven propelling means and the brakes of the vehicle.

References Cited in the file of this patent

UNITED STATES PATENTS

| | | |
|---|---|---|
| 1,283,211 | Kintzing | Oct. 29, 1918 |
| 1,320,142 | Hanson | Oct. 28, 1919 |
| 1,391,529 | Crochat | Sept. 20, 1921 |
| 1,461,028 | Davis | July 10, 1923 |
| 1,540,170 | Frick | June 2, 1925 |
| 1,587,083 | Neuzerling | June 1, 1926 |
| 2,176,469 | Moueix | Oct. 17, 1939 |
| 2,188,293 | Williams | Jan. 23, 1940 |
| 2,244,528 | Schur | June 3, 1941 |
| 2,321,874 | Tandler et al. | June 15, 1943 |
| 2,522,893 | Purington | Sept. 19, 1950 |
| 2,590,574 | Robinson | Mar. 25, 1952 |

OTHER REFERENCES

QST for October 1938, pages 42–44, Radio control of powered models, by Clinton B. De Soto, published by American Radio Relay League, 38 LaSalle Road, West Hartford, Conn.